(12) United States Patent
Cheng et al.

(10) Patent No.: US 9,697,078 B2
(45) Date of Patent: Jul. 4, 2017

(54) METHOD AND DEVICE FOR AUTO RECOVERY STORAGE OF JBOD ARRAY

(71) Applicant: Zhejiang Uniview Technologies Co., Ltd, HangZhou (CN)

(72) Inventors: Hao Cheng, HangZhou (CN); Qiang Ding, HangZhou (CN)

(73) Assignee: ZHEJIANG UNIVIEW TECHNOLOGIES CO., LTD, Zhejiang (CN)

( * ) Notice: Subject to any disclaimer, the term of this patent is extended or adjusted under 35 U.S.C. 154(b) by 169 days.

(21) Appl. No.: 14/411,896

(22) PCT Filed: Nov. 8, 2013

(86) PCT No.: PCT/CN2013/086766
§ 371 (c)(1),
(2) Date: Dec. 29, 2014

(87) PCT Pub. No.: WO2014/075586
PCT Pub. Date: May 22, 2014

(65) Prior Publication Data
US 2015/0193305 A1 Jul. 9, 2015

(30) Foreign Application Priority Data
Nov. 13, 2012 (CN) .......................... 2012 1 0455316

(51) Int. Cl.
*G06F 11/00* (2006.01)
*G06F 11/10* (2006.01)
(Continued)

(52) U.S. Cl.
CPC ...... *G06F 11/1076* (2013.01); *G06F 11/2094* (2013.01); *G06F 11/3034* (2013.01); *G06F 11/3055* (2013.01)

(58) Field of Classification Search
CPC ................................... G06F 11/1076
See application file for complete search history.

(56) References Cited

U.S. PATENT DOCUMENTS

| 6,052,799 A * | 4/2000 | Li ....................... G06F 11/1435 711/114 |
| 7,069,468 B1 * | 6/2006 | Olson ................. G06F 11/2092 714/4.2 |

(Continued)

FOREIGN PATENT DOCUMENTS

| CN | 101120319 A | 2/2008 |
| CN | 101291247 A | 10/2008 |

(Continued)

OTHER PUBLICATIONS

ISA Chinese Patent Office, International Search Report of PCT/CN2013/086766, Nov. 8, 2013, 4 pages.

*Primary Examiner* — Christopher McCarthy
(74) *Attorney, Agent, or Firm* — McCoy Russell LLP

(57) ABSTRACT

A method for auto recovery storage of JBOD array is disclosed. The method includes: determining whether a disk of the JBOD array is failed, deleting a storage resource according to a storage resource list for the failed disk is stored with an index area upon determining the failed disk, updating the index area corresponding to a recorded data area when the failed disk is stored with the storage resource of the recorded data area instead of the index area; transmitting control instructions indicative of adding a hot spare to the JBOD array to add the hot spare to the JBOD array, and adding the storage resource and activating the storage resource for the failed disk stored with the index area after the hot spare is added to the JBOD array.

5 Claims, 3 Drawing Sheets

(51) Int. Cl.
*G06F 11/20* (2006.01)
*G06F 11/30* (2006.01)

(56) References Cited

U.S. PATENT DOCUMENTS

| | | | | |
|---|---|---|---|---|
| 7,434,090 | B2 * | 10/2008 | Hartung | G06F 11/1092 |
| | | | | 714/6.2 |
| 7,587,631 | B2 | 9/2009 | Shimmitsu | |
| 8,464,090 | B2 * | 6/2013 | Nagpal | G06F 11/1092 |
| | | | | 714/2 |
| 2002/0059539 | A1 | 5/2002 | Anderson | |
| 2014/0380090 | A1 * | 12/2014 | Kobayashi | G06F 11/14 |
| | | | | 714/6.12 |

FOREIGN PATENT DOCUMENTS

| | | |
|---|---|---|
| CN | 102012847 A | 4/2011 |
| CN | 102081580 A | 6/2011 |
| CN | 102521058 A | 6/2012 |
| JP | 2003157153 A | 5/2003 |

\* cited by examiner

METHOD AND DEVICE FOR AUTO RECOVERY STORAGE OF JBOD ARRAY

CROSS-REFERENCE TO RELATED APPLICATIONS

The present application is a U.S. National Phase of International Application No. PCT/CN2013/086766, entitled, "METHOD AND DEVICE FOR AUTOMATICALLY RECOVERING STORAGE OF JBOD ARRAY" filed on Nov. 8, 2013, which claims priority to Chinese Patent Application No. 201210455316.0, filed with the Chinese Patent Office on Nov. 13, 2012, the entire contents of each of which are hereby incorporated by reference for all purposes.

BACKGROUND OF THE INVENTION

1. Field of the Invention

The present disclosure relates to storage technology, and more particularly to a method and device for auto recovery storage of JBOD array.

2. Discussion of the Related Art

JBOD (Just a Bunch Of Disks) is one recently developed storage array being widely adopted in storage monitoring field.

As shown in FIG. 1, the JBOD array includes four physical disks serially connected in sequence so as to be operated as a huge logical disk. The information is stored starting from the first disks, and then is stored in the next disk when the current disk is full.

In the Surveillance storage field, the cost for deploying the JBOD devices is much lower than that of the RAID. Usually, the disks of the JBOD device are deployed within one rack providing a share power supplier and fans. As such, additional hardware components may be omitted and the devices can be easily managed. That's the reason why the JBOD devices have been widely adopted.

However, one of the disadvantages of the JBOD device is the shortage of backup mechanism. The information stored on the JBOD device may not be recovered if one or a plurality of disks have been damaged.

In addition, there is no automatic hot spare mechanism under JBOD infrastructure. The stored information may be lost if users have not replaced the failed disks by the hot spare.

After detecting failed disks within the JBOD device, a system alert indicating the failed disk is sent to an user interface or by flashing an alerting lamp so as to notify the users of the failed disk. In this way, the users may replace the failed disk after being notified of this issue.

However, such mechanism cannot notify the users to replace the failed disk in time if the location is quiet remote from the user or the event happens in deep night. The recorded video saved on the storage resource affected by the failed disks may be lost for a long time period.

SUMMARY

In one aspect, a method for auto recovery storage of JBOD array includes: step A: determining whether a disk of the JBOD array is failed; step B: deleting the storage resource having index area stored in the failed disk according to a storage resource list upon determining the failed disk; updating the index area corresponding to a recorded data area if the failed disk is stored with the recorded data of the storage resource instead of the index area according to the storage resource list; transmitting control instructions indicative of adding a hot spare to the JBOD array to add the hot spare to the JBOD array; and adding the storage resource and activating the storage resource for the failed disk stored with the index area after the hot spare is added to the JBOD array.

Wherein, after step A, the method further includes:
step B1: transmitting the control instructions to remove the failed disk from the JBOD array to the JBOD array upon determining the failed disk.

Wherein, after the step B, the method further includes:
step C: deleting the storage resource list of the failed disk and establishing the storage resource list of the hot spare.

Wherein the method further comprises executing step B upon determining the storage device corresponding to the JBOD array comprises a partially-idle hot spare or a fully-idle hot spare Wherein step A further includes: periodically reading state information of each of the disks within a JBOD array control module of the JBOD array and determining the disk is failed when the state information of the disk is FAULTY.

In another aspect, a device for auto recovery storage of JBOD array includes: a failed-disk determining module is configured for determining whether the disk is failed; a storage-resource deleting module is configured for deleting the storage resource having index area stored in the failed disk according to a storage resource list upon determining the failed disk; an index updating module is configured for updating the index area corresponding to a recorded data area if the failed disk is stored with the recorded data of the storage resource instead of the index area; a hot-spare-disk adding module is configured for transmitting the control instructions indicative of adding the hot spare to the JBOD array; and a storage-resource recovery module is configured for adding the storage resource and activating the storage resource which has the index area stored in the failed disk after the hot spare is added to the JBOD array.

Wherein the method further includes: a failed-disk removing module for transmitting the control instructions to remove the failed disk from the JBOD array upon determining the failed disk.

Wherein the method further includes: a storage-resource-list updating module for deleting the storage resource list of the failed disk and establishing the storage resource list of the hot spare.

Wherein the method further includes: an idle-hot-spare-disk determining module for determining idle hot spares for determining whether the JBOD array includes an partially-idle hot spare or the storage device corresponding to the JBOD array includes a fully-idle hot spare.

Wherein the failed-disk determining module is further configured for periodically reading state information of each of the disks within a JBOD array control module and determining the disk is failed when the state information of the disk is FAULTY.

In view of the above, the JBOD array is prevented from losing recorded video due to an un-replaced failed disk so as to reduce the number of times needed to perform manual maintenance.

DETAILED DESCRIPTION OF THE EMBODIMENTS

Embodiments of the invention will now be described more fully hereinafter with reference to the accompanying drawings, in which embodiments of the invention are shown.

In one embodiment the method for auto recovery storage of JBOD array includes the steps described hereinafter.

In step A, a determination is made regarding whether a disk of the JBOD array is failed.

In step B, a storage resource is deleted according to a storage resource list for the failed disk stored with an index area upon determining the failed disk; and the index area corresponding to a recorded data area is updated when the failed disk is stored with the storage resource of the recorded data area instead of the index area. In addition, control instructions indicative of adding hot spares are transmitted to the JBOD array to add the hot spare to the JBOD array. After the hot spare has been added to the JBOD array, the storage resource is added and activated for the failed disk stored with the index area.

In step A, the determination may be made by periodically reading state information of each of the disks within the JBOD array control module. When operating in a kernel mode, IO response processes are executed for all of the write-IO instructions issued by the JBOD array, and results of the write-IO instructions have to be followed. Upon determining an un-recoverable failure for the write-IO instruction occurs in one of the disk of the JBOD array, the corresponding disk state of the JBOD array control module is configured as "Faulty." As such, the disk is determined as failed when the information of the disk state is "Faulty."

The storage space provided by the JBOD array is considered as the storage resources of the corresponding monitoring devices arranged in its front-end, such as an IPC. Before the recorded video is stored, usually a storage plan is established, in which the storage space for each monitoring device located in the front end could be determined. After configuration is finished, the device located in the front end may have its own storage resource on the storage device i.e., JBOD array, located in the back end. The information of the storage resource is documented by a storage resource list. The storage resource list may be documented in one of the configuration documents of the storage device where the JBOD array is located. Generally, after the user completes the configuration of the JBOD array and configure the resource allocation on the JBOD array in accordance with the storage plan, the disk configuration of JOBD array and the storage resource configuration of each disk will be recorded in the configuration documents of the storage device.

Figure 1:
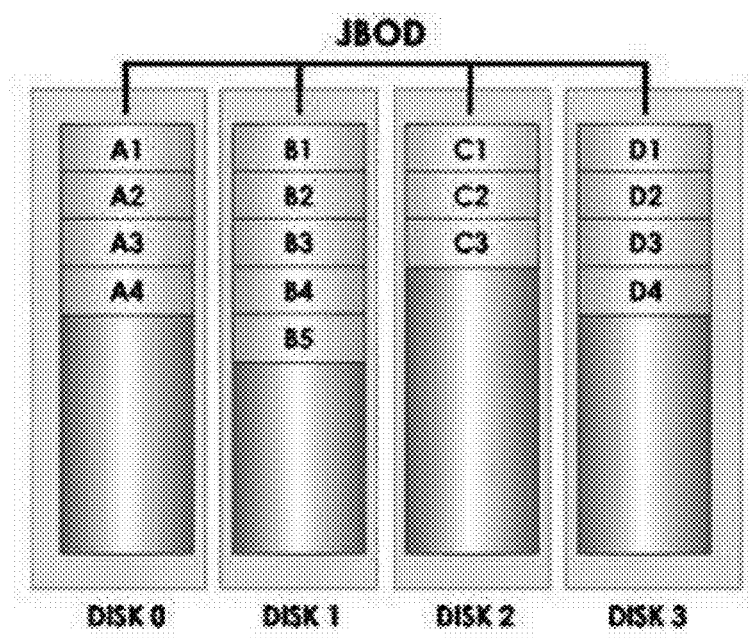
FIG. 1 is a schematic view of JBOD array in accordance with one embodiment.
Figure 2:
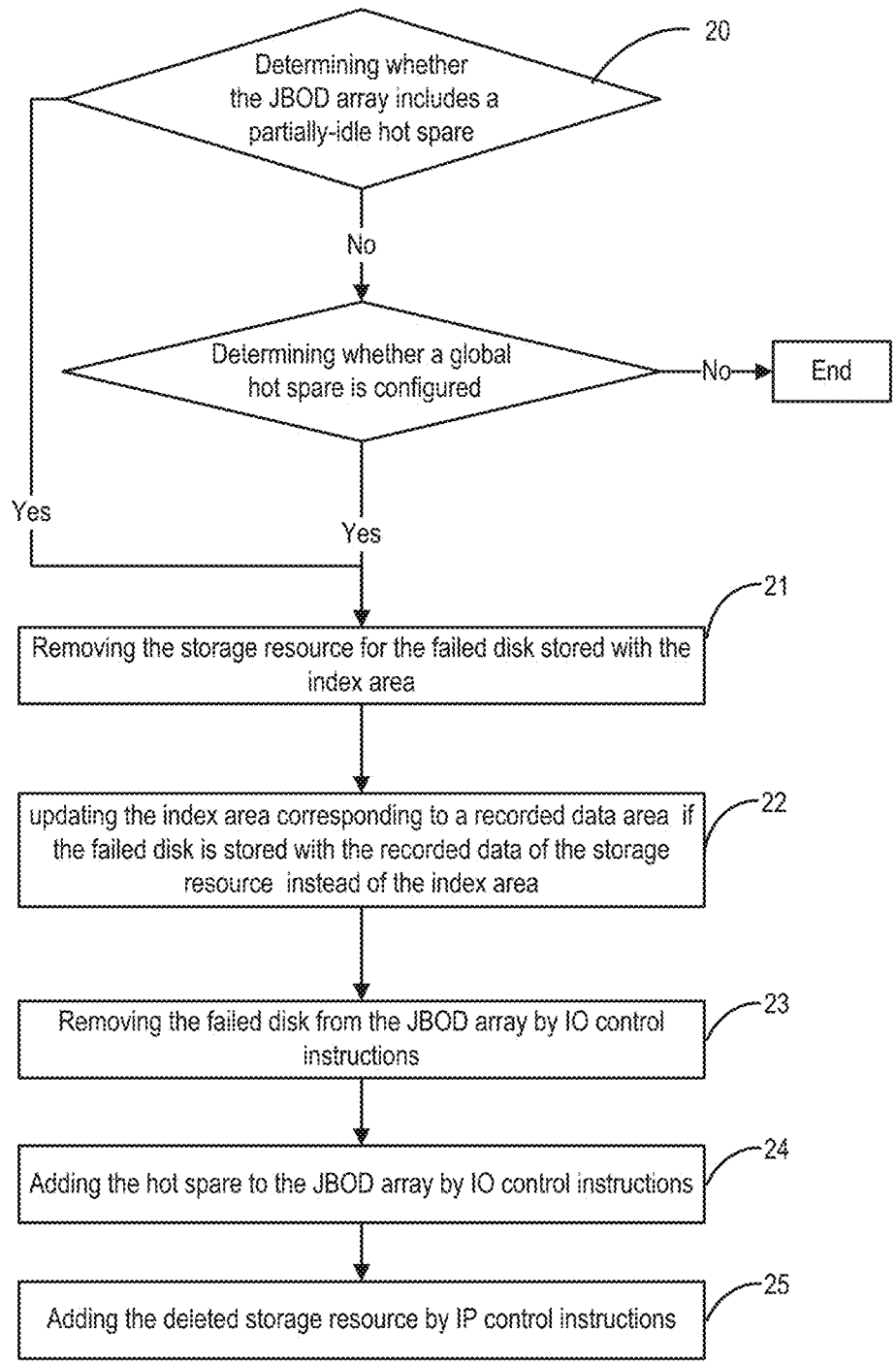
FIG. 2 is a flowchart illustrating a method in accordance with one embodiment.

FIG. 2 is a flowchart illustrating a method of automatically replacing the failed disk by the hot spare in the JBOD array in accordance with one embodiment.

In step 20: determining whether an idle hot spare exists. If yes, the process goes to step 21. Otherwise, the process ends.

First, the method determines whether the JBOD array includes a partially-idle hot spare. If not, the method determines whether the storage device corresponding to the JBOD array includes a fully-idle hot spare. The process ends when the JBOD array and the storage device both have no idle hot spare. Otherwise, the process goes to step 21.

With respect to the user experience, the user is permitted to select one or a plurality of hot spares to be a global hot spare or to be a partial spare for one JBOD array via a management interface of the storage device where the JBOD array is located. The partial hot spare is designated only for one JBOD array, and the global hot spare may be used by any one of the JBOD arrays or RAID array of the storage device. The configuring parameters of the hot spares may be stored in the configuration document.

In step 21: removing the storage resource for the failed disk stored with the index area.

In step 22: the index area corresponding to the recorded data area is updated when the failed disk is stored with the storage resource of the recorded data area, instead of the index area.

If the index data allocated to the storage resource of the front-end monitoring device is lost, the recorded video data is unable to be stored on the allocated resource. Even though a portion of the recorded data may be lost, the storage resource may still continue storing the video. Thus, it is needed to distinguish the index area and the recorded data area on the disks of the JBOD array. Table 1 has shown the information regarding the index area and the recorded data area on the disk (named "sdb") of the JBOD array with respect to the storage resources named as "Res1" through "Res4".

TABLE 1

Disk (sdb) storage resource list

| Name of storage resource | Occupied space | Size of the index area | Size of the recorded data area |
|---|---|---|---|
| Res1 | 200 G | 0 | 200 G |
| Res2 | 300 G | 1 G | 299 G |
| Res3 | 300 G | 1 G | 299 G |
| Res4 | 200 G | 1 G | 199 G |

It can be seen from Table 1 that the storage resource Res1 is stored only with the recorded data area, without the index area, but the storage resource Res2~Res4 are stored with the index area on the disk (sdb) of the JBOD array. As each of the storage resource has its own index area, and thus the index area of the storage resource Res1 is stored on another disk within the same JBOD array, such as sda. Table 2 is an example allocation of the storage resource Res1 on the disk sda.

TABLE 2

Disk (sda) storage resource list

| Name of storage resource | Occupied space | Size of the index area | Size of the recorded data area |
|---|---|---|---|
| Res1 | 100 G | 1 | 99 G |

Each of the disks of the JBOD array respectively form its own storage resource list for documenting the allocation of the storage resource on the disk.

When detecting the failed disk, the process described below may be performed for each of the storage resource according to the storage resource list of the failed disk.

For the storage resource on the failed disk stored with the index area, the IO control instructions are issued to delete the storage resource. For the storage resource on the failed disk only stored with the recorded data area, without the index area, the lost portion of the recorded data area is processed in a data lost way and the corresponding index within the index area of related disks are updated. In addition, the updated index area is distributed to the corresponding disks.

For instance, when disk (sdb) failed, the storage resource Res2, Res3, and Res, as shown in Table. 1, are deleted. The index information corresponding to the recorded data stored on the disk (sdb) is updated. That is, the index area of the storage resource Res1 on the disk (sda) corresponding to the recorded data on the disk (sdb) is updated.

Step 23: Removing the Failed Disk from the JBOD Array

The JO control instructions are transmitted to the JBOD array to remove the failed disk from the JBOD array upon determining the failed disk. The JBOD array removes the failed disk after receiving the JO control instructions.

Step 24: Adding the Hot Spare to the JBOD Array.

The JO control instructions are transmitted to the JBOD array to add the hot spare to the JBOD array. After receiving the JO control instructions, the hot spare is added to the JBOD array, and the newly-added hot spare is located corresponding to the failed disk.

Step 25: Recovering the Storage Resource.

The storage resource is added and activated for the storage resource stored with the index area by the JO control instructions. In addition, the storage resource is added and activated in accordance with the storage resource list of the failed disk.

Taking the above-mentioned disk (sdb) as one example, the storage resource Res2, Res3, and Res4 may be added and be activated again.

When the above space allocation process is completed, the storage resource list of the failed disk is deleted, and the storage resource list of the hot spare is established at the same time.

In view of the above, the failed disk of the JBOD array may be automatically replaced by idle disks. With respect to the storage resource stored with key index area on the failed disk, the server of the monitoring system may re-allocate the storage space and then distributes the storage plan to the front-end monitoring device such that the coming recorded data may be stored in time. With respect to the storage resource without key index area on the failed disk, only with recorded data area, the corresponding index is automatically updated. Even though a portion of the recorded data is lost, the newly recorded data may be still stored.

In view of the above, the JBOD array is prevented from losing recorded video due to an un-replaced failed disk so as to reduce the number of times needed to perform manual maintenance.

Figure 3:
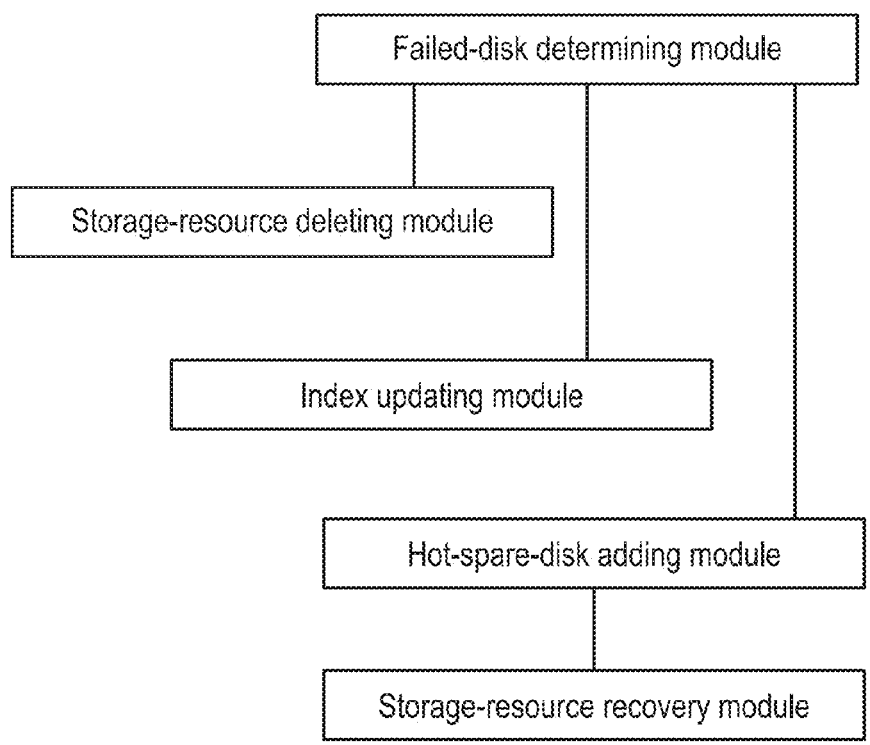
FIG. 3 is a block diagram of the device in accordance with one embodiment.

FIG. 3 is a block diagram of the logic device for auto recovery storage of JBOD array ("the device"). A processor may fetch the machine readable instructions stored in a memory to perform the auto recovery storage of JBOD array.

The logic device includes a failed-disk determining module, a storage-resource deleting module, an index updating module, a hot-spare-disk adding module, and a storage-resource recovery module.

The failed-disk determining module is configured for determining whether the disk is failed.

The storage-resource deleting module is configured for deleting the storage resource according to a storage resource list for the failed disk is stored with an index area upon determining the failed disk.

The index updating module is configured for updating the index area corresponding to a recorded data area when the failed disk is stored with the storage resource of the recorded data area instead of the index area.

The hot-spare-disk adding module is configured for transmitting the control instructions indicative of adding the hot spare to the JBOD array.

The storage-resource recovery module is configured for adding the storage resource and activating the storage resource for the failed disk stored with the index area after the hot spare is added to the JBOD array.

The device further includes a failed-disk removing module for transmitting the control instructions to remove the failed disk from the JBOD array upon determining the failed disk.

The device further includes a storage-resource-list updating module for deleting the storage resource list of the failed disk and establishing the storage resource list of the hot spare.

The device further includes an idle-hot-spare-disk determining module for determining idle hot spares for determining whether the JBOD array includes an partially-idle hot spare or the storage device corresponding to the JBOD array includes a fully-idle hot spare.

In addition, the failed-disk determining module is further configured for periodically reading state information of each of the disks within a JBOD array control module and determining the disk is failed when the state information of the disk is FAULTY.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A device for auto recovery storage of a Just a Bunch Of Disks (JBOD) array, comprising a processor and a non-transitory storage medium storing machine-executable instructions corresponding to a JBOD array auto recovery storage logic, wherein, by executing the machine-executable instructions the processor is caused to:
   determine whether a disk is failed;
   delete a storage resource having index area stored in the failed disk according to a storage resource list upon determining the failed disk;
   update the index area corresponding to a recorded data area if the failed disk is stored with recorded data of the storage resource instead of the index area;
   transmit the instructions indicative of adding a hot spare to the JBOD array; and
   add the storage resource and activate the storage resource which has the index area stored in the failed disk after the hot spare is added to the JBOD array.

2. The device as claimed in claim 1, wherein the machine-executable instructions further cause the processor to:
   transmit the instructions to remove the failed disk from the JBOD array upon determining the failed disk.

3. The device as claimed in claim 1, wherein the machine-executable instructions further cause the processor to:
   delete the storage resource list of the failed disk and establish the storage resource list of the hot spare.

4. The device as claimed in claim 1, wherein the machine-executable instructions further cause the processor to:
   determine whether the JBOD array includes a partially-idle hot spare or whether the storage device corresponding to the JBOD array includes a fully-idle hot spare.

5. The device as claimed in claim 1, wherein, when determining whether the disk is failed, the machine-executable instructions further cause the processor to:
    periodically read state information of each of the disks within a JBOD array control module and determine the disk is failed when the state information of the disk is FAULTY.

\* \* \* \* \*